United States Patent
Nakanishi et al.

(10) Patent No.: US 6,210,464 B1
(45) Date of Patent: Apr. 3, 2001

(54) MIXED GAS-SEPARATING MEMBRANE MODULE AND PROCESS

(75) Inventors: Shunsuke Nakanishi; Masao Kikuchi; Yoshihiro Kusuki, all of Ichihara; Tatsuo Yamamoto; Mitsuo Maeda, both of Ube, all of (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 09/305,528

(22) Filed: May 5, 1999

(30) Foreign Application Priority Data

Mar. 15, 1999 (JP) .................................. 11-068039

(51) Int. Cl.$^7$ ............................. B01D 53/22; B01D 63/02

(52) U.S. Cl. ......................................... 95/52; 96/8; 96/10

(58) Field of Search ................................. 95/45, 52; 96/4, 96/8, 10

(56) References Cited

U.S. PATENT DOCUMENTS

| 4,718,921 | * | 1/1988 | Makino et al. .......................... 96/8 X |
| 4,857,081 | * | 8/1989 | Taylor ...................................... 96/8 X |
| 4,865,736 | * | 9/1989 | Coiplan ................................... 96/8 X |
| 4,929,259 | * | 5/1990 | Caskey et al. .......................... 96/8 X |
| 5,002,590 | * | 3/1991 | Friesen et al. .......................... 96/8 X |
| 5,013,437 | * | 5/1991 | Trimmer et al. ........................ 96/8 X |
| 5,059,374 | * | 10/1991 | Krueger et al. .......................... 96/8 X |
| 5,067,971 | * | 11/1991 | Bikson et al. ........................ 96/10 X |
| 5,084,073 | * | 1/1992 | Prasad ..................................... 95/52 |
| 5,160,511 | * | 11/1992 | Lovelock ................................ 96/8 X |
| 5,226,932 | * | 7/1993 | Prased ..................................... 95/45 |
| 5,259,869 | * | 11/1993 | Auvil et al. ............................ 95/52 |
| 5,500,036 | * | 3/1996 | Kalthod .................................. 96/8 X |

(List continued on next page.)

FOREIGN PATENT DOCUMENTS

| 63-297415 | | 11/1988 | (JP) . | |
| 1-056116A | * | 3/1989 | (JP) | ............................................ 96/8 |
| 1-107826A | * | 4/1989 | (JP) . | |

(List continued on next page.)

OTHER PUBLICATIONS

English Abstract corresponding to JP–A–63–267415.
English Abstract corresponding to JP–A–5–177111.
English Abstract corresponding to JP–A–2–59016.
English Abstrct corresponding to JP–A–2–222717.

*Primary Examiner*—Robert H. Spitzer
(74) *Attorney, Agent, or Firm*—Burgess, Ryan & Wayne; Milton J. Wayne; William R. Moran (57) ABSTRACT

A mixed gas-separating membrane module having a high separating efficiency includes a cylindrical container having a mixed gas-feed section, a non-permeated gas-delivery section, and a middle section; a bundle of a plurality of hollow fibers each extending through the middle section and each having an end portion opening to the mixed gas-feed section and an opposite end portion opening to the non-permeated gas-delivery section; a pair of a first disk supporting the hollow fiber end portion opening to the mixed gas-feed section and partitioning the middle section from the mixed gas-feed section, and a second disk supporting the opposite hollow fiber end portions opening to the non-permeated gas-delivery section and partitioning the middle section from the non-permeated gas-delivery section, the first and second disks supporting the hollow fibers so that the hollow fibers are spaced from each other, to leave a continuous space between the hollow fibers; and a cylindrical film member surrounding the hollow fiber bundle to such an extent that the continuous space formed between the hollow fibers is connected to a permeated gas-delivery outlet of the middle section, the middle section, having a permeated gas-delivery outlet located close to the first disk and a carrier gas-feed inlet located close to or in the second disk, to allow the carrier gas fed into the middle section to flow through the continuous space, countercurrently to the flow of the mixed gas through the hollow fibers.

17 Claims, 4 Drawing Sheets

U.S. PATENT DOCUMENTS

| | | | |
|---|---|---|---|
| 5,525,143 | * 6/1996 | Morgan et al. | 96/8 X |
| 5,554,283 | * 9/1996 | Brinda et al. | 96/8 X |
| 5,605,564 | * 2/1997 | Collins | 96/8 X |
| 5,961,692 | * 10/1999 | Collins | 96/8 X |
| 6,004,383 | * 12/1999 | Kühmelt | 96/8 |

FOREIGN PATENT DOCUMENTS

| | | | |
|---|---|---|---|
| 1-199623A | * 8/1989 | (JP) | 96/8 |
| 1-281124A | * 11/1989 | (JP) | 96/8 |
| 1-281125A | * 11/1989 | (JP) | 96/8 |
| 1-281126A | * 11/1989 | (JP) | 96/8 |
| 259016 | 2/1990 | (JP) . | |
| 2-059016A | * 2/1990 | (JP) | 96/8 |
| 2-135117A | * 5/1990 | (JP) | 96/8 |
| 2222717 | 9/1990 | (JP) . | |
| 3-086219A | * 4/1991 | (JP) | 96/10 |
| 3-112819A | * 5/1991 | (JP) . | |
| 5177111 | 7/1993 | (JP) . | |
| 7-079954 | * 8/1995 | (JP) . | |

\* cited by examiner

MIXED GAS-SEPARATING MEMBRANE MODULE AND PROCESS

BACKGROUND OF THE INVENTION

1. Field of the Invention

The present invention relates to a mixed gas-separating membrane module and a process for separating a gas fraction having a high membrane permeability from a mixed gas. More particularly, the present invention relates to a mixed gas-separating membrane module containing a plurality of hollow fibers which allows a specific gas fraction-contained in a mixed gas to permeate through the hollow fibers and to be removed from the mixed gas, and a non-permeated gas fraction of the mixed gas to be collected, as a process using the mixed gas-separating membrane module for separating the specific gas fraction from the mixed gas.

Still more particularly, the present invention relates to a mixed gas-separating membrane module appropriate for separating water vapor from an organic substance vapor contained in the mixed gas, and to a mixed gas separating process using the membrane module and appropriate for separating water vapor from an organic substance vapor contained in the mixed gas.

2. Description of the Related Art

As a dewatering method for an aqueous solution of an organic substance, Japanese Unexamined Patent Publication No. 63-267415 discloses a dewatering and concentration process for an aqueous organic substance solution, comprising preparing a mixed gas containing an organic substance vapor and water vapor by evaporating an aqueous solution containing an organic substance; bringing the mixed gas into contact with a primary side surface of a mixed gas-separating membrane made from an aromatic polyimide at a temperature of 70° C. or more, to selectively allow the water vapor to permeate through the mixed gas-separating membrane and to be collected as a permeated gas fraction on the secondary side surface of the membrane; and collecting, as a non-permeated gas fraction, the organic substance containing vapor having a reduced water content at the primary side surface.

This Japanese publication discloses an example of the process as mentioned above, wherein the secondary side, on which the gas fraction (water vapor) permeated through the membrane is collected, is maintained under a high level of reduced pressure, to selectively allow the water vapor to permeate through the membrane and to be separated from the organic substance vapor-containing gas fraction. In another example of the above-mentioned process, although the secondary side of the mixed gas-separating membrane is not maintained under a reduced pressure, a dry gas flows, as a carrier gas, along the secondary side surface of the membrane, to promote the selective permeation of the water vapor through the membrane and the separation of the water vapor from the organic substance vapor.

The above-mentioned dewatering process for the mixed gas, wherein the removal of the water vapor is carried out while maintaining the secondary side of the mixed gas-separating membrane under a reduced pressure, or passing a carrier gas consisting of a dry gas along the secondary side surface of the membrane, has the following disadvantages.

The permeating rate of the water vapor through the mixed gas-separating membrane per unit area of the membrane is not always satisfactory, and thus the scale of the mixed gas-separating membrane module is enlarged.

Also, the dryness (dewatering degree) of the non-permeated gas fraction left on the primary side of the membrane cannot easily reach the desired high level.

Further, since the dewatering process is carried out under a high level of reduced pressure, a vacuum pump capable of generating a high level of vacuum, is necessary, and a large amount of energy must be consumed for driving the vacuum pump.

Furthermore, to obtain a high degree of dewatering of the mixed gas by using the carrier gas under the ambient atmospheric pressure, a dry gas which is expensive must be used as a carrier gas in a large amount.

To remove the above-mentioned disadvantages, Japanese Patent publication No. 2,743,346 discloses a process for dewatering a solution containing water and an organic substance, in which a solution containing water and an organic substance is evaporated to prepare a mixed gas comprising water vapor and an organic substance vapor;

the mixed gas is fed into a mixed gas-separating membrane module which contains aromatic polyimide mixed gas-separating membranes each having:

(a) a water vapor-permeating rate ($P'H_2O$) of $1 \times 10^{-5}$ $cm^3/cm^2 \cdot sec \cdot cmhg$ or more, and (b) a ratio ($P'H_2O/P'org$) of the water vapor-permeating rate ($P'H_2O$) to an organic substance vapor-permeating rate ($P'org$) is 100 or more, at a temperature of 70° C. or more, to bring the mixed gas into contact with primary (feed) side surfaces of the membranes; the secondary (permeate) sides of the membranes are exposed to a reduced pressure of 50 to 500 mmHg; and an inert dry gas or a portion of a non-permeated gas delivered from the membrane module is passed, as a carrier gas, through the secondary sides of the membranes to thereby selectively allow the water vapor to permeate through the membrane from the primary (feed) sides to the secondary (permeate) sides thereof and to be separated from a non-permeated organic substance vapor-containing gas, and to collect the organic substance vapor-containing gas having a reduced water content.

The above-mentioned process and membrane module enables the water/organic substance mixed gas to be dewatered. However, there is a strong demand for a dewatering process and apparatus for the mixed gas with an enhanced efficiency. Also, there is a strong demand of a mixed gas-separating process and apparatus capable of separating a gas fraction having a high membrane-permeating property, which is not limited to water vapor, from a mixed gas with a high efficiency.

As a constitution of a conventional gas-separating membrane module, Japanese Examined Patent Publication No. 6-91,932 discloses a gas-separating module in which a specific fiber bundle assembly formed from a bundle of hollow fibers having a function of selectively allowing a specific gas fraction (for example, a hydrogen gas fraction) in various mixed gases to permeate through the hollow fibers, is contained in an appropriate arrangement in a cylindrical container having a material gas-introduction inlet, a permeated gas outlet and non-permeated gas-outlet, and the periphery of the fiber bundle is covered with a film member. However, the module disclosed in the above-mentioned publication is one to be applied to a recovery of hydrogen, and thus the permeation side of the separating membrane has a structure usable only for delivering the permeated gas. Therefore, this module cannot be used for the case where water vapor is separated from a mixed gas comprising an organic substance vapor and water vapor, by making the permeation side of the separating membrane into a reduced pressure condition and by flowing a carrier gas through the permeation side of the separating membrane.

Also, Japanese Examined Patent Publication No. 7-79, 954 discloses a gas-separating membrane module having a bundle of a plurality of gas-separating hollow fibers. This module has a core pipe located in a substantially center portion of the hollow fiber bundle and having apertures connected to a non-permeated gas outlet, and a cylindrical partitioning plate arranged in the hollow fiber bundle along the hollow fibers. The purpose of the invention disclosed in the publication is to enlarge the gas flow path and to enhance the feed line speed of the material gas while maintaining the length of the hollow fiber-shaped separating membranes constant. However, since an empty space is formed between the outer side of the hollow fiber bundle and the module container, the gas passes through the empty space and thus does not effectively pass through the continuous space between the hollow fibers. Also, since, in certain portions of the module, the gas outside of the hollow fibers flows in the same direction as that of the gas within the hollow fibers, the gas-separation efficiency of this module is not sufficiently high in comparison with the countercurrent type module.

SUMMARY OF THE INVENTION

An object of the present invention is to provide a mixed gas-separating membrane module and process for separating a gas fraction having a high separating membrane-permeability from a mixed gas with a high efficiency.

Another object of the present invention is to provide a mixed gas-separating membrane module and process which are most suitable for the dewatering method disclosed in Japanese Patent No. 2,743,346, and in which a dry organic substance vapor having a high level of dryness (a very low water content) is used in a small scale gas-separating membrane module having a relatively small membrane area, to easily obtain a high separation efficiency (a large amount of permeated water vapor per unit area of the gas-separating membrane).

The above-mentioned objects can be attained by the mixed gas-separating membrane module and process of the present invention.

The mixed gas-separating membrane module of the present invention comprises:

(1) a cylindrical container having a mixed gas-feed section having a mixed gas-feed inlet, a non-permeated gas-delivery section having a non-permeated gas-delivery outlet, and a middle section located between the mixed gas-feed section and the non-permeated gas-delivery section and having a carrier gas-feed inlet and a permeated gas-delivery outlet;

(2) a bundle of a plurality of mixed gas-separating hollow fibers each comprising a shell portion and a hollow portion surrounded by the shell portion, each extending through the middle section of the cylindrical container and each having an end portion thereof opening to the mixed gas-feed section and an opposite end portion thereof opening to the non-permeated gas-delivery section;

(3) a pair of a first hollow fiber-supporting disk which supports the end portions of the hollow fibers opening to the mixed gas-feed section and partitioning the middle section from the mixed gas-feed section, and a second hollow fiber-supporting disk which supports the opposite end portions of the hollow fibers opening to the non-permeated gas-delivery section and partitioning the middle section from the non-permeated gas-delivery section, the first and second hollow fiber-supporting disks supporting the hollow fibers in such a manner that the hollow fibers are spaced from each other, to leave a continuous space between the hollow fibers; and (4) a cylindrical film member surrounding the hollow fiber bundle to such an extent that the continuous space formed between the hollow fibers is connected to the permeated gas-delivery outlet of the middle section, wherein, in the middle section, the permeated gas-delivery outlet is located close to the first hollow fiber-supporting disk and the carrier gas-feed inlet is located close to or in the second hollow fiber-supporting disk, to allow the carrier gas fed into the middle section through the carrier gas-feed inlet to flow through the continuous space formed between the hollow fibers and surrounded by the cylindrical film member, countercurrently to the flow of the mixed gas through the hollow portions of the hollow fibers.

In the mixed gas-separating membrane module of the present invention, the cylindrical film member preferably covers at least 70% of the total area of the peripheral face of the bundle of the hollow fibers.

The mixed gas-separating membrane module of the present invention optionally further comprises a carrier gas-introduction pipe through which a carrier gas-supply source is connected to a substantially center portion of the hollow fiber bundle through the second hollow fiber-supporting disk, whereby the carrier gas is allowed to flow from the center portion toward the permeated gas-delivery outlet through the continuous space formed between the hollow fibers.

In an embodiment of the mixed gas-separating membrane module of the present invention, the carrier gas-introduction pipe is inserted into the center portion of the hollow fiber bundle and the inserted portion of the pipe has a closed end and a plurality of apertures formed in a portion of the pipe close to the second hollow fiber-supporting disk, to allow the carrier gas to be introduced into the middle section of the cylindrical container through the apertures of the pipe and to flow through the continuous space formed between the hollow fibers.

In the mixed gas-separating membrane module of the present invention the mixed gas-separating hollow fibers are preferably selected from aromatic polyimide hollow fibers.

In another embodiment of the mixed gas-separating membrane module of the present invention, the mixed gas-feed inlet is connected to a supply source of a mixed gas comprising water vapor and an organic substance vapor; the hollow fibers are selected from aromatic polyimide hollow fibers; the carrier gas-feed inlet is connected to a supply source of a carrier gas comprising a dry inert gas or a portion of the non-permeated gas fraction delivered through the non-permeated gas-delivery outlet; the permeated gas-delivery outlet is connected to a pressure-reducing means, whereby the water vapor is separated from the organic substance vapor through the aromatic polyimide hollow fibers, and is delivered as a permeated gas, together with the carrier gas, and the organic substance vapor having a reduced content of water vapor is collected as a non-permeated gas.

The process of the present invention for separating a mixed gas by using the mixed gas-separating membrane module as defined above comprises:

feeding a mixed gas comprising a first gas fraction and a second gas fraction into the mixed gas-feed section of the cylindrical container through the mixed gas-feed inlet, to cause the fed mixed gas to flow through the hollow portions of the hollow fibers, the first gas fraction having a permeation rate through the shell portions of the hollow fibers in a ratio to that of the second gas fraction of 100 or more, thereby to allow the first gas fraction to permeate through the shell portions of the hollow fibers;

simultaneously feeding a carrier gas into the middle section of the cylindrical container through the carrier gas-feed inlet, while reducing the pressure of the middle section of the cylindrical container, to cause the fed carrier gas to flow through the continuous space formed between the hollow fibers toward the permeated gas-delivery outlet, while forcibly diluting the permeated first gas fraction therewith;

delivering the permeated first gas fraction diluted with the carrier gas through the permeated gas-delivery outlet; and collecting the non-permeated second gas fraction passed through the hollow portions of the hollow fibers, and received in the non-permeated gas-delivery section, through the non-permeated gas-delivery outlet.

In an embodiment of the mixed gas-separating process of the present invention the mixed gas comprises, as a first gas fraction, water vapor and as a second gas fraction, a vapor of at least one organic substance having a boiling temperature of from 0° C. to 200° C. under the ambient pressure.

In the above-mentioned embodiment of the mixed gas-separating process of the present invention, the organic substance for the second gas fraction preferably comprises isopropyl alcohol.

In the mixed gas-separating process of the present invention, a portion of the collected non-permeated second gas fraction is optionally recycled to the carrier gas-feed inlet and is used as a carrier gas.

In the mixed gas-separating process of the.present invention, the carrier gas preferably comprises nitrogen gas.

In another embodiment of the mixed gas-separating process of the present invention, the mixed gas comprises water vapor as a first gas fraction and isopropyl alcohol vapor as a second gas fraction; the hollow fibers are selected from aromatic polyimide hollow fibers; and the carrier gas comprises a dry inert gas, whereby the water vapor is separated from the isopropyl alcohol vapor through the shell portions of the aromatic polyimide hollow fibers, and is delivered, as a permeated gas, together with the carrier gas, and the isopropyl alcohol vapor having a reduced water vapor content is collected as a non-permeated gas.

In another embodiment of the mixed gas-separating membrane module of the present invention, the cylindrical container has at least one removable end portion, and the hollow fiber bundle, the first and second hollow fiber-supporting disks and the cylindrical film member are combined to form a replaceable cartridge.

The mixed gas-separating process of the present invention optionally further comprises subjecting, before the mixed gas is prepared from a corresponding mixed liquid, the mixed liquid to at least one refining treatment selected from the group consisting of ion-exchange resin treatments, distillation treatments and filtration treatments.

The mixed gas-separating process of the present invention optionally further comprises subjecting the collected non-permeated gas fraction to a liquefying procedure, and then to at least one refining treatment selected from the group consisting of ion-exchange resin treatments, distillation treatments and filtration treatments.

DESCRIPTION OF THE PREFERRED EMBODIMENTS

The mixed gas-separating membrane module and process of the present invention will be explained with reference to the attached drawings.

Figure 1:
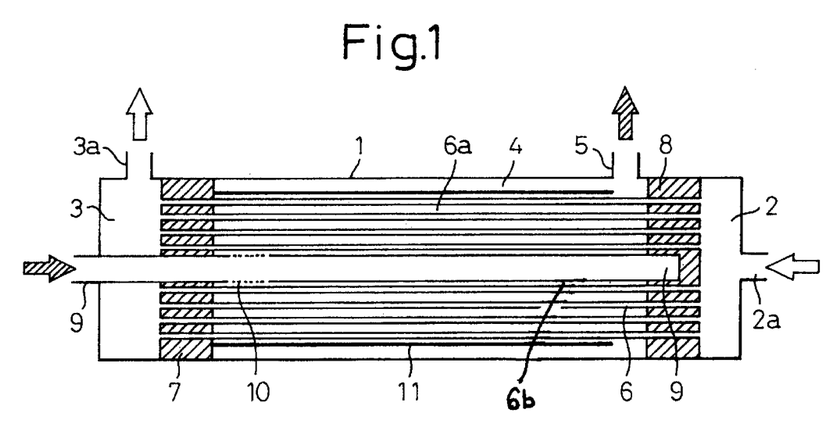
FIG. 1 shows a cross-section of an embodiment of the mixed gas-separating membrane module of the present invention.

In FIG. 1 showing a cross-section of an embodiment of the mixed gas-separating membrane module of the present invention, a cylindrical container 1 has a mixed gas-feed section 2, a non-permeated gas-delivery section 3 and a middle section 4 located between the mixed gas feed section 2 and the non-permeated gas-delivery section 3. The mixed gas-feed section 2 has a mixed gas-feed inlet 2a, and the non-permeated gas-delivery section 3 has a non-permeated gas-delivery outlet 3a. The middle section 4 has a permeated gas-delivery outlet 5 and is connected to a carrier gas-feed inlet 10.

In FIG. 1, a bundle of a plurality of mixed gas-separating hollow fibers 6 each comprising a shell portion and a hollow portion surrounded by the shell portion and each extending through the middle portion 4 of the cylindrical container 1. Each hollow fiber 6 has an end portion thereof opening to the mixed gas-feed section 2 and an opposite end portion thereof opening to the non-permeated gas-delivery section 3. The mixed gas-feed section 2, the non-permeated gas-delivery section 3 and the middle section 4 are gas-tightly partitioned from each other with a pair of first and second hollow fiber-supporting disks 7 and 8. The first disk 8 gas-tightly supports the end portions of the hollow fibers 6 opening to the mixed gas-feed section 2 and gas-tightly partitions between the middle section 4 and the mixed gas-feed section 2, and the second disk 7 gas-tightly supports the opposite end portions of the hollow fibers opening to the non-permeated gas-delivery section 3 and gas-tightly partitions between the middle section 4 and the non-permeated gas-delivery section 3.

The first and second hollow fiber-supporting disks 8 and 7 fix the end portions of the hollow fibers 6 in such a manner that the hollow fibers are spaced from each other, to leave a continuous space 6a between the hollow fibers. The hollow fibers in the bundle may be in the form of straight lines or of curved lines and may be arranged parallel to each other or not parallel to each other.

In FIG. 1, a carrier gas-introduction pipe 9 is inserted into a center portion of the hollow fiber bundle through the non-permeated gas-delivery section 3 and the second hollow fiber-supporting disk 7. An end portion of the pipe 9 extending to outside of the cylindrical container 1 is connected to a supply source of a carrier gas (not shown in FIG. 1) and the opposite end portion of the pipe 9 is inserted into and supported by the first hollow fiber-supporting disk 8. The opposite end of the pipe 9 is closed. The carrier gas-introduction pipe 9 inserted into the center portion of the hollow fiber bundle has a plurality of apertures 10 formed in the inserted portion of the pipe 9 located close to a face of the second hollow fiber-supporting disk 7 facing to the middle section 4 and evenly distributed in the portion of the pipe 9. The apertures 10 serve as a carrier gas-feed inlet. Through the apertures 10, a carrier gas fed through the pipe 9 is evenly introduced into the middle section 4 and flows through the continuous space formed between the hollow fibers.

In FIG. 1, the mixed gas-separating membrane module has a cylindrical film member 11 surrounding the hollow fiber bundle to such an extent that the continuous space formed between the hollow fibers is connected to the permeated gas-delivery outlet 5 of the middle section 4, located close to the first hollow fiber-supporting disk 8.

In the middle section 4 of the membrane module of FIG. 1, since the permeated gas-delivery outlet 5 is located close to the first hollow fiber-supporting disk 8 and the carrier gas-feed inlet (apertures) 10 is located close to the second hollow fiber-supporting disk 7, the carrier gas fed into the middle section 4 through the carrier gas-feed inlet (apertures) 10 is allowed to flow through the continuous space 6a formed between the hollow fibers 6 and surrounded by the cylindrical film member 11. In the continuous space 6a, the carrier gas flows countercurrently to the flow of the mixed gas through the hollow portions of the hollow fibers.

In FIG. 1, the carrier gas-introduction pipe 9 extending through the second disk 7 need not be firmly fixed to the first disk 8 as long as the pipe 9 and the first disk 8 are gas-tightly combined under conditions under which the membrane module is employed.

Also, in FIG. 1, the center empty space 6b of the hollow fiber bundle, into which the carrier gas-introduction pipe 9 is inserted, is formed substantially in a center portion of the hollow fiber bundle, but is not limited to a location in a true center portion of the hollow fiber bundle, as long as the carrier gas introduced into the middle section 4 can evenly diffuse into the continuous space 6a formed between the hollow fibers 6 and surrounded by the cylindrical film member 11.

Referring to FIG. 1, a mixed gas is fed into the mixed gas-feed section 2 of the cylindrical container 1 through the mixed gas-feed inlet 2a and evenly distributed into the hollow spaces of the hollow fibers 6. While the mixed gas passes through the hollow portions of the hollow fibers 6, a gas fraction of the mixed gas having a higher permeability through the shell portions of the hollow fibers 6 than that of the remaining gas fraction permeates through the shell portions. The permeated gas fraction flows through the continuous space 6a toward the permeated gas-delivery outlet 5.

Simultaneously, a carrier gas is fed into the middle section 4 through the carrier gas-introduction pipe 9 and a plurality of apertures 10. The introduced carrier gas flows through the continuous space 6a substantially along the hollow fibers 6, while diluting the permeated gas fraction with the carrier gas, to promote the permeation rate of the permeating gas fraction through the shell portions of the hollow fibers 6 by reducing the concentration of the permeated gas fraction in the permeation side (continuous space) of the hollow fibers.

The permeated gas fraction diluted with the carrier gas is delivered to the outside of the module through the permeated gas-delivery outlet 5.

The non-permeated gas fraction passes through the hollow portions of the hollow fibers, is collected in the non-permeated gas-delivery section 3 and is delivered to the outside of the module through the non-permeated gas-delivery outlet 3a.

In the embodiment of the mixed gas-separating membrane module as shown in FIG. 1, the carrier gas-introduction pipe 9 is inserted into the middle section 4 through the second disk 7, and the carrier gas-feed apertures 10 are formed in the inserted portion of the pipe 9 into the middle section 4. However, the location of the carrier gas-feed inlet 10 is not limited to that shown in FIG. 1. Preferably, the carrier gas-feed inlet 10 is located close to the second disk 7.

Figure 2:
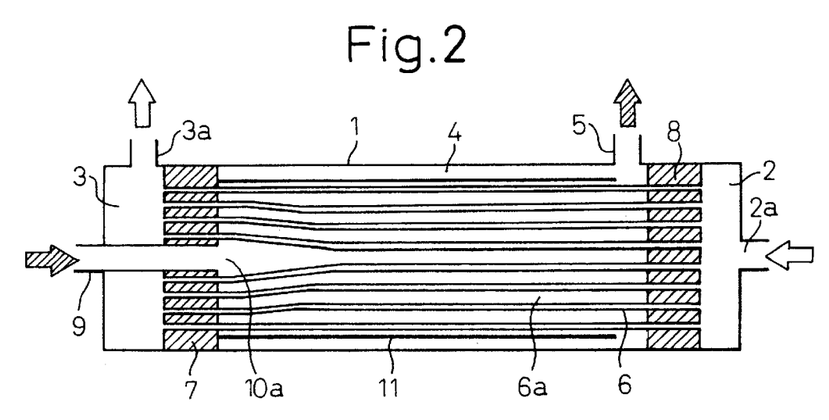
FIG. 2 shows a cross-section of another embodiment of the mixed gas separating membrane module of the present invention.

In FIG. 2, a carrier gas-introduction pipe 9 is inserted into the second disk 7 through the non-permeated gas-delivery section 3. An end of the pipe 9 is connected to a supply source of the carrier gas (not shown in FIG. 2) and the opposite end 10a of the pipe 9 opens at the inside face of the second disk to the center portion of the hollow fiber bundle, to form a carrier gas feed inlet. Namely, in this case, the carrier gas-feed inlet is formed in the second disk 7. When the carrier gas is introduced into the center portion of the middle section through the carrier gas-feed inlet 10a, the introduced carrier gas diffuses into the continuous space 6a formed between the hollow fibers 6 and surrounded by the cylindrical film member 11 and flows through the continuous space 6a countercurrently to the flow of the mixed gas passing through the hollow portions of the hollow fibers 6.

Figure 3:
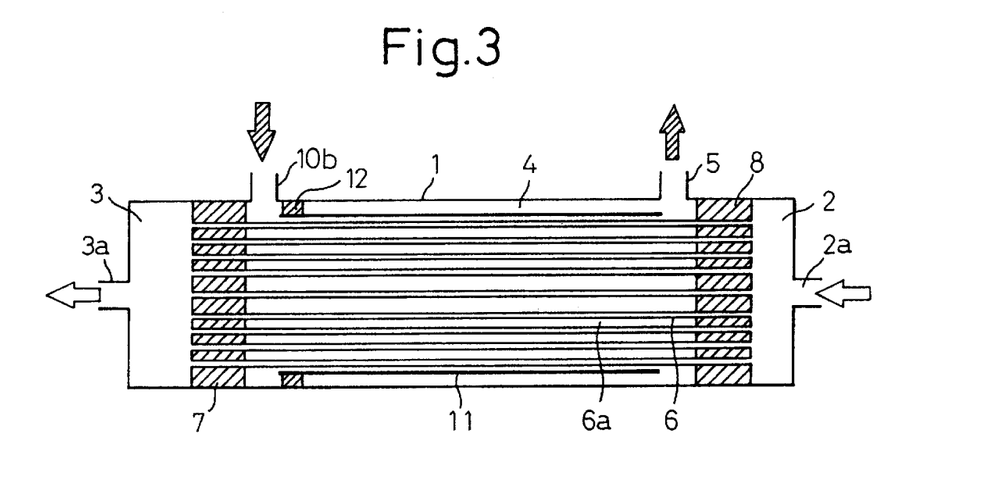
FIG. 3 shows a cross-section of still another embodiment of the mixed gas-separating membrane module of the present invention.

In FIG. 3, the hollow fiber bundle has no center empty space and thus the hollow fibers 6 are evenly distributed in the bundle. A carrier gas-feed inlet 10b is formed in the periphery of the middle section 4 and is located close to the second disk 7. The cylindrical film member 11 is supported at an end thereof on a fixing member 12 projected inward from the inside peripheral surface of the middle section of the cylindrical container. The opposite end of the cylindrical film member 11 may be not supported. The fixing member 12 is located between the carrier gas-feed inlet 10b and the permeated gas-delivery outlet 5 and close to the carrier gas-feed inlet 10b, to allow the carrier gas fed into the middle section 4 through the carrier gas-feed inlet 10b to evenly diffuse into and flow through the hollow space 6a formed between the hollow fibers 6 and surrounded by the cylindrical film member 11. The fixing member 12 prevents a direct pass of the carrier gas fed into the middle section, to the permeated gas-delivery outlet, and is preferably in the form of a ring (annulus).

Figure 4A:
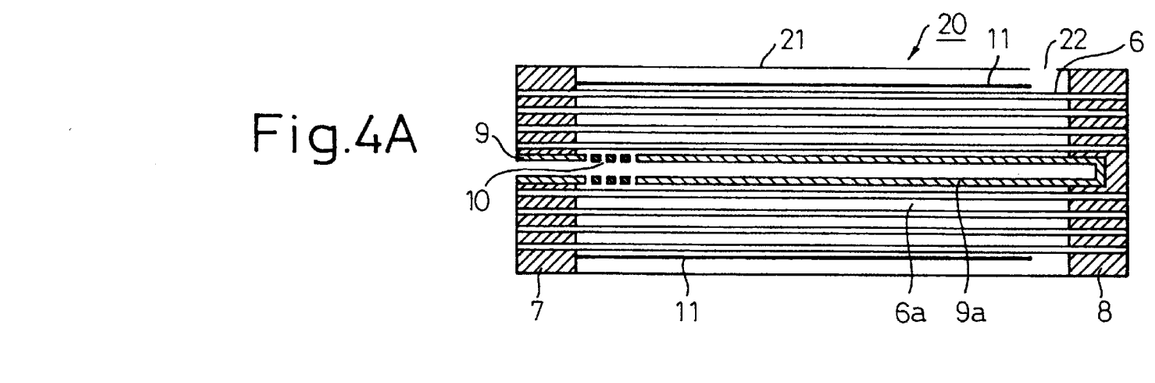
FIG. 4A shows a cross-section of an embodiment of the replaceable cartridge comprising a hollow fiber bundle, first and second hollow fiber-supporting disks, a cylindrical film member and optionally, a covering member usable for the mixed gas-separating membrane module of the present invention.

In FIG. 4A, a replaceable cartridge 20 is formed from a bundle of a plurality of gas-separating hollow fibers 6, first and second hollow fiber-supporting disk 7 and 8, and a cylindrical film member 11 combined with each other in the same manner as that shown in FIG. 1.

The cartridge 20 further has a cylindrical covering member 21 connected at both ends thereof gas-tightly to the first and second disks 8 and 7, and surrounding the cylindrical film member 11 and the hollow fiber bundle. The cylindrical covering member 21 has an opening 22 through which the inside of the cartridge 20 is connected to the permeated gas-delivery outlet 5.

In an embodiment, the cartridge 20 further comprises a carrier gas-introduction pipe member 9a inserted into a center portion of the hollow fiber bundle. An end portion of the pipe member 9a is inserted into the first disk 8 and has a closed end thereof. The opposite end of the pipe member 9a opens to the outside. In the opposite end portion of the pipe member 9a there are a plurality of apertures 10 located close to the opposite end of the pipe member 9a. The apertures 10 serve as a carrier gas-feed inlet.

Figure 4B:
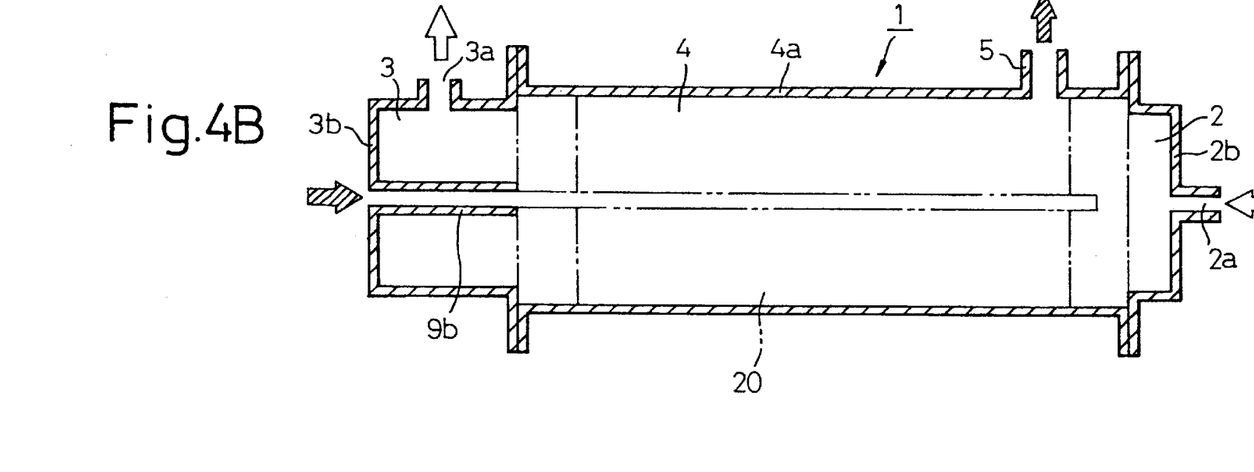
FIG. 4B shows a cross-section of an embodiment of the cylindrical container suitable for receiving the replaceable cartridge as shown in FIG. 4A, for the mixed gas-separating membrane module of the present invention.

Referring to FIG. 4B, a cylindrical container 1 is formed from a mixed gas-feed section-forming member 2b, a non-permeated gas-delivery section-forming member 3b and a middle section-forming cylindrical member 4a, which are separable from each other. When at least one of the mixed gas-feed section-forming member 2b and the non-permeated gas-delivery section-forming member 3b is separated from the middle section-forming cylindrical member 4a, the cartridge can be inserted into the middle section 4.

In an embodiment, the non-permeated gas-delivery section forming member 3b has a carrier gas-introduction pipe member 9b inserted into the member 3b and having an end thereof connected to a supply source of carrier gas (not shown in FIG. 4B) and an opposite end thereof opening to the middle section 4. When the cartridge 20 shown in FIG. 4A, is set in the middle section 4 of the cylindrical container 1, the opening opposite the end of the pipe member 9b is connected gas-tightly to the opening end of the pipe member 9a of the cartridge 20, to form a carrier gas-introduction pipe 9 as shown in FIG. 1.

The replaceable cartridge is advantageous in that when the gas-separating hollow fibers are deteriorated in the module, the deteriorated hollow fibers can be easily removed and replaced by fresh hollow fibers by replacing the used cartridge with a new cartridge. Also, the hollow fiber bundle can be easily stored and transported. Therefore, the utilization of the cartridge is an economical advantage.

In the mixed gas-separating membrane module of the present invention, the hollow fibers are preferably formed from aromatic polyimides, for example, those as disclosed in Japanese Unexamined Patent Publication No. 2-222,717, which exhibit a high gas-separating property and an excellent resistance to organic solvents.

There is no limitation to the composition of the mixed gas as long as the mixed gas contains a gas fraction having a much higher permeability through the gas-separating membrane than that of the remaining gas fraction. Preferably, the higher gas permeability of the gas fraction through the mixed gas-separating membrane is 100 times or more than that of the remaining gas fraction.

In a preferable embodiment, the mixed gas comprises water vapor and an organic substance vapor or air. In this embodiment, the water vapor can be removed from the mixed gas by using the mixed gas-separating membrane module of the present invention. Specifically, the organic substance gas or air can be dewatered by using the mixed gas-separating membrane module of the present invention.

In view of the thermal resistance of the mixed gas-separating hollow fibers and the equipment necessary for generating the organic substance, the mixed gas preferably has a boiling temperature of from 0° C. to 200° C. under the ambient atmospheric pressure. The mixed gas-separating membrane module and process of the present invention are advantageously applicable to the dewatering of ethyl alcohol or isopropyl alcohol, because the dewatering efficiency of the module and process of the present invention is higher than that of conventional distillation-dewatering or other apparatuses and processes. Isopropyl alcohol is widely used in the semiconductor industry and chemical industry. The dewatering module and process of the present invention are advantageously used for the dewater-refining procedure for the used isopropyl alcohol containing water. In the mixed gas used in the module and process of the present invention, the larger the ratio in permeability through the mixed gas-separating membrane of a gas fraction to be removed from the mixed gas to the remaining gas fraction, the higher the separation efficiency of the gas fractions from each other. When the permeability ratio is less than 100, the mixed gas may not be satisfactorily separated.

In the mixed gas-separating membrane module and process of the present invention, the carrier gas is not limited to a specific type of gas, as long as the carrier gas is free from a gas which should be removed by permeation from the mixed gas, or the carrier gas contains the gas to be removed in a low concentration which causes a partial pressure of the gas to be removed contained in a permeated gas-carrier gas mixture in the permeation side of the mixed gas-separating membrane module to be lower than that in the non-permeation side of the mixed gas-separating membrane module. For example, nitrogen gas or air can be used as a carrier gas, the nitrogen gas is useful for the mixed gas-separating membrane module and the process of the present invention, because the nitrogen gas is useful as non-flammable gas when the mixed gas contain an organic gas or vapor, and is difficult to reverse-permeate from the permeation side to the non-permeation side through the mixed gas-separating membrane. In the case where an organic substance vapor is dewatered, an inert dry gas, dry air, or a nitrogen enriched air prepared by using a gas-separating membrane is preferably used as a carrier gas. The inert dry gas is preferably a nitrogen gas. Alternately, a portion of non-permeated gas obtained by removing the gas to be removed by the mixed gas-separating membrane module or process of the present invention may be recycled to the carrier gas-feed inlet and used as a carrier gas.

In the mixed gas-separating membrane module of the present invention, the materials for forming the cylindrical container and the carrier gas-introduction pipe are not limited to specific ones as long as the materials have a necessary gas-sealing property and pressure resistance. Usually the cylindrical container and the carrier gas-introduction pipe (which may be divided into a pipe member inserted into the non-permeated gas-delivery section and an other pipe member arranged in the hollow fiber bundle cartridge) are made from metal materials, plastic resins or ceramic materials. For the mixed gas to be separated, the hollow fibers are preferably made from a fiber-forming polymeric material which exhibits a ratio in gas permeation rate through the shell portions of the hollow fibers, of a gas fraction permeable through the shell portions to a remaining gas fraction non-permeable through the shell portions, of 100 or more, more preferably 200 or more, still more preferably 500 or more. When the mixed gas comprises water vapor as a permeable gas fraction and an organic substance vapor as a non-permeable gas fraction, the hollow fibers for the mixed gas preferably exhibit a water vapor-permeability (P'H$_2$O) of $1 \times 10^{-5}$ cm$^3$/cm$^2$·sec·cmHg or more, more preferably about $5 \times 10^{-1}$ to about $1 \times 10^{-4}$ cm$^3$/cm$^2$·sec·cmhg, still more preferably about 0.5 to about $5.0 \times 10^{-3}$ cm$^3$/cm$^2$·sec·cmHg, and a ratio in permeability (P'H$_2$O)/(P'org) of the water vapor-permeability (P'H$_2$O) to the organic substance vapor permeability (P'org) of 100 or more. The hollow fibers are preferably selected from aromatic polyimide hollow fibers having the above-mentioned gas permeating properties. The hollow fibers may be asymmetric hollow fibers each of which comprises an inner porous layer and an outer dense layer.

When the permeability ratio is less than 100, the hollow fibers are unsatisfactory in gas-separating property for the mixed gas.

The hollow fibers preferably have a shell thickness of 50 to 20 μm and an outer diameter of 300 to 800 μm.

The first and second hollow fiber-supporting disks are preferably formed from thermosetting resins having a high thermal resistance and a high resistance to organic solvents, for example, polyurethane resins, phenol-formaldehyde resins, and epoxy resins.

The cylindrical film member is preferably formed from film or foil-forming materials which substantially do not allow the mixed gas fed into the module to permeate therethrough or have a high resistance to gas permeation, for example, plastic films such as polyethylene, polypropylene, polyamide, polyester and polyimide films and metallic foils such as stainless steel foils. Among the above-mentioned films and foils, the polyimide films which have a high thermal resistance, organic solvent resistance and processability, are advantageously used for the present invention. There is no limitation to the thickness of the cylindrical film member of the present invention. Usually, the cylindrical film member preferably has a thickness of 20 μm to 0.5 mm, more preferably 50 μm to 0.1 mm.

The cylindrical film member preferably covers at least 70%, more preferably 85 to 95%, of the total area of the peripheral face of the bundle of the hollow fibers.

In an embodiment of the module, the cylindrical film member is fixed at an end thereof to the second hollow fiber-supporting disk. In another embodiment, an end of the cylindrical film member is fixed on a fixing member projected inward from the inside peripheral face of the middle section of the cylindrical container and preferably. located close to the carrier gas-feed inlet.

The cylindrical film member contributes to promoting a countercurrent flow of the carrier gas mixed with the permeated gas to the flow of the mixed gas through the hollow portions of the hollow fibers, and to preventing a short pass of the carrier gas fed into the middle section, to the permeated gas-delivery outlet. The assembly of the hollow fiber bundle, with the first and second hollow fiber-supporting disks, and the cylindrical film member can be prepared by the following procedure.

A bundle of a plurality of hollow fibers is wrapped with a film, for example, a polyester film, and the two edges of the wrapping film facing each other are bonded to each other to form a cylindrical film member. End portions of the combination of the hollow fiber bundle and the cylindrical film member are adhered with a bonding resin, for example, an epoxy resin, in such a manner that the bonding resin penetrates between the end portions of the hollow fibers to space the hollow fibers from each other, and are formed into a disk form. First and second hollow fiber-supporting disks are formed. An end portion of the cylindrical film member is fixed to the second disk. The opposite end portion of the hollow fiber bundle is bonded with the bonding resin in the same manner as mentioned above, to form a first hollow fiber-supporting disk. The opposite end of the cylindrical film member is spaced from the first disk and is not fixed to the first disk. Then, the outside face portions of the first and second disks are cut off to ensure the ends of the hollow fibers opening to the outside.

In the resultant assembly, a continuous space is formed between the hollow fibers and is connected to the outside through a gap between the opposite free end of the cylindrical film member and the first hollow fiber-supporting disk.

When a carrier gas-introduction pipe is contained in the module, the bundle of the hollow fibers are formed around the carrier gas-introduction pipe in a desired thickness, and is wrapped with the film.

The second hollow fiber-supporting disk is formed from the bonding resin so that an open end portion of the carrier gas-introduction pipe is inserted through the second disk and opens to the outside, and a closed end portion of the pipe is inserted into the first disk and supported thereby.

When the hollow fiber bundle cartridge as shown in FIG. 4A is used, the periphery of the cartridge is covered by a cylindrical covering member which is preferably made from a plastic resin, for example, a polyethylene, polypropylene, polyamide, polyester or polyimide resin, or a metal, for example, a stainless steel.

Figure 5:
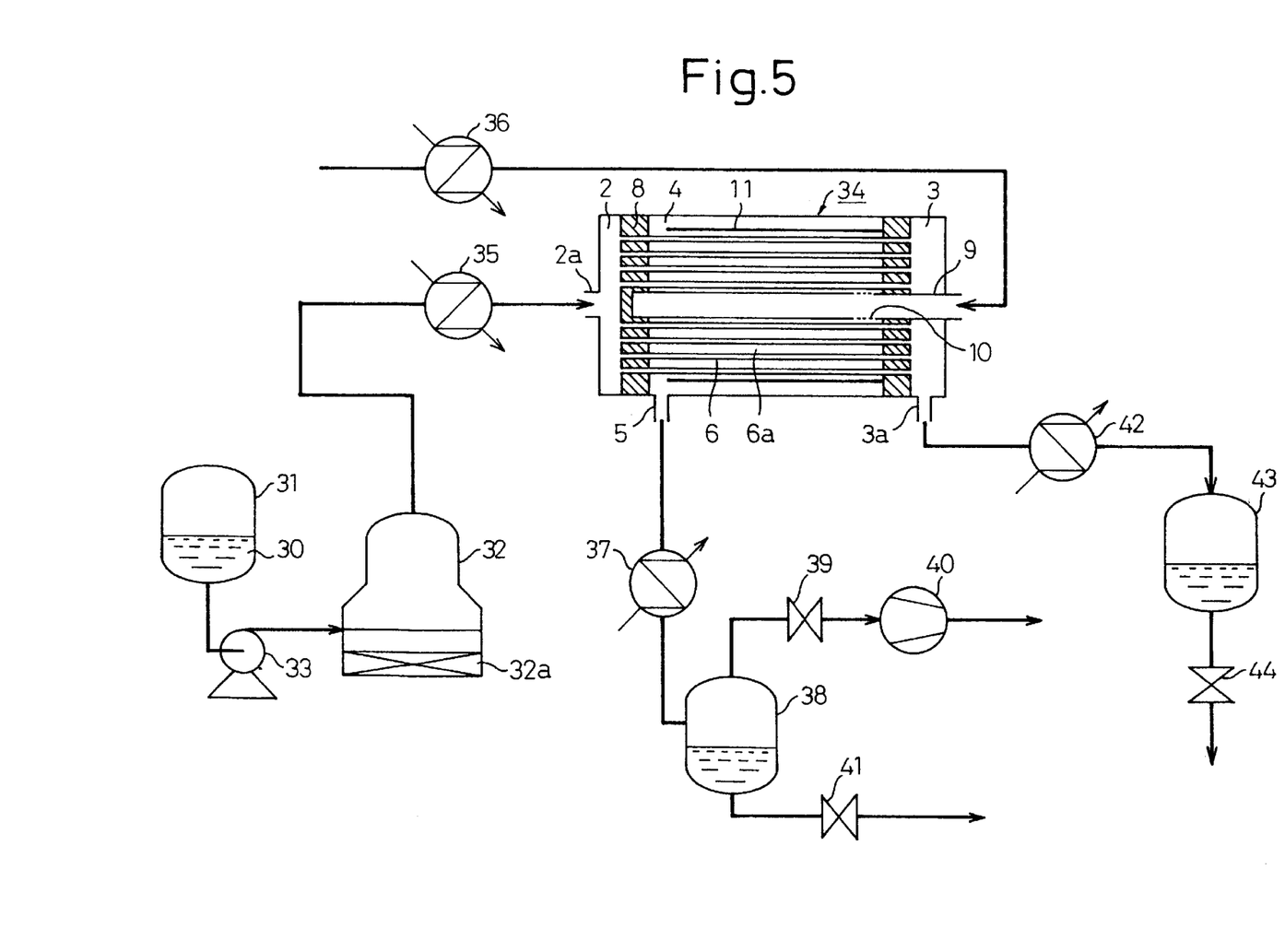
FIG. 5 is a flow diagram of an embodiment of the process of the present invention for separating a mixed gas by using the mixed gas-separating membrane module of the present invention.

Referring to FIG. 5, when a mixed gas comprising water vapor and an organic substance vapor is fed into a mixed gas-separating membrane module of the present invention having a carrier gas-introduction pipe to remove the water vapor from the mixed gas and to collect the organic substance vapor, a mixed liquid 30 comprising water and a volatile organic substance is fed from a mixed liquid-storage tank 31 into an evaporator 32 with a heater 32a through a liquid pump 33. In the evaporator 32, the mixed liquid 30 is heated by the heater 32a and is evaporated into a mixed gas comprising water vapor and an organic substance vapor. The mixed gas is fed from the evaporator 32 into a mixed gas-separating membrane module 34 optionally through a superheater 35 in which the mixed gas is superheated to a temperature at which the water vapor and the organic substance vapor are not condensed. The superheated mixed gas is fed into a mixed gas-feed section 2 through a mixed gas-feed inlet 2a, evenly distributed into the hollow portions of the hollow fibers 6, and passes through the hollow portions of the hollow fibers, while allowing the water vapor fraction in the mixed gas to permeate through the shell portions of the hollow fibers and to diffuse into the continuous space 6a between the hollow fibers 6. Simultaneously, a dry carrier gas which is free from water vapor is heated in a heater 36 to a desired temperature, and fed into a carrier gas-introduction pipe 9 of the mixed gas-separating membrane module 34 and then is introduced into the continuous space 6a between the hollow fibers through a plurality of apertures 10 which serves as a carrier gas-feed inlet. The carrier gas flows through the continuous space 6a countercurrent to the flow direction of the mixed gas in the hollow portions of the hollow fibers, and dilutes the permeated water vapor diffused into the continuous space between the hollow fibers to reduce the partial pressure of the water vapor in the permeation side of the membrane and to promote the permeation of the water vapor through the shell portions of the hollow fibers. The water vapor diluted with the carrier gas flows through the continuous space surrounded by the cylindrical film member 11 and is delivered through a permeated gas-delivery outlet.

A non-permeated organic substance vapor is collected from the hollow portions of the hollow fibers 6 into a non-permeated gas section 3 and is delivered through a non-permeated gas-delivery outlet 3a.

The water vapor-carrier gas mixture delivered from the module 34 is cooled in a cooler 37 to condense the water vapor and separate the carrier gas from the condensed water. The condensed water is stored in a water tank 38, and the carrier gas separated from the condensed water is recovered through the tank, a valve 39 and a vacuum pump 40. The vacuum pump 40 is used to reduce the pressure in the permeation side of the module 34. The water in the tank 38 can be discharged through a valve 41.

The non-permeated organic substance vapor delivered from the module 34 is fed to a cooler 42 in which the non-permeated organic substance vapor is condensed. The condensed organic substance is stored in a tank 43 and is delivered from the tank 43 through a valve 44.

The mixed gas is preferably fed at a temperature of 70° C. or more into the mixed gas-separating membrane module. The hollow fibers preferably exhibit a water vapor-permeability ($P'H_2O$) of $1 \times 10^{-5}$ cm$^3$/cm$^2 \cdot$sec$\cdot$cmHg or more, and a permeability ratio ($P'H_2O/P'org$) of 100 or more.

In the process of the present invention, in which a mixed gas is dewatered by using the mixed gas-separating membrane module of the present invention, the mixed gas containing water vapor is fed into the module to cause the mixed gas to flow through the hollow portions of the hollow fibers, while reducing the pressure in the permeation side of the module by using a vacuum pump to promote the permeation of the water vapor through the shell portions of the hollow fibers while feeding an inert dry carrier gas (for example, nitrogen gas), which is optionally pre-heated by a heater, into the permeation side of the module to dilute the permeated water vapor with the carrier gas and to promote the permeation of the water vapor through the shell portions of the hollow fibers.

The non-permeated gas comprising the organic substance vapor is collected from the hollow portions of the hollow fibers and delivered from the module. The non-permeated gas has a significantly reduced water content. Therefore, a portion of the non-permeated gas may be recycled into the module and utilized as a carrier gas.

In the process as shown in FIG. 5, the organic substance vapor delivered as a non-permeated gas from the module 34, is preferably cooled and condensed by a cooler 42, the condensed organic substance liquid is collected in the liquid tank 43. Also, the water vapor permeated through the shell portions of the hollow fibers is diluted with the carrier gas, and the water vapor/carrier gas mixture is delivered from the module 34 and cooled by a cooler 37, to condense the water vapor and to separate the carrier gas from the condensed water. The condensed water is collected and stored in the tank 38 and discharged from the tank 38 to the outside of the mixed gas-separating system.

The mixed liquid for the mixed gas may be refined, before generating the mixed gas from the mixed liquid, by at least one refining treatment selected from, for example, ion-exchange resin treatments, distillation refining treatments and filtration treatments, to remove solid particles, high boiling temperature substances and dissolved metals from the mixed liquid. Also, after the non-permeated gas is collected from the module 34 and condensed (liquefied) by the cooler 42, the condensed product is optionally subjected to a refining treatment selected from, for example, ion-exchange resin treatment, distillation treatments and filtration treatment, to remove the solid particles, the high boiling temperature impurities and dissolved metals from the condensed product.

In the ion exchange resin treatments, when the impurities are anionic, an anion exchange resin is used, and when the impurities are cationic, a cation exchange resin is used. Also, when the impurities include both anionic substances and cationic substances, a mixed ion exchange column in which a mixture of an anionic resin with a cationic resin in a certain mixing ratio is used is preferably employed.

In the distillation treatment, a distillation column is preferably equipped with a reflux condenser arranged close to the top of the distillation column. The reflux condenser contributes to enhancing the refining efficiency of the distillation-refining procedure.

In the filtration treatment, a particle-removing filter is preferably employed.

EXAMPLES

The present invention will be further illustrated by the following examples.

Example 1

Referring to FIG. 5 showing a mixed gas-separating system, a mixed gas was prepared by feeding a mixed liquid comprising 95.13% by weight of isopropyl alcohol and 4.87% by weight of water from a storage tank 31 into an evaporator 32 through a liquid pump 33. In the evaporator 32, the mixed liquid is heat-evaporated by a heater 32a; the resultant mixed gas was superheated by a superheater 35 to a temperature of 120° C.; and the superheated mixed gas is fed into a mixed gas-separating membrane module 34. The membrane module 34 contains a bundle of aromatic polyimide hollow fibers which have a total gas-permeation surface area of 1.9 m$^2$ and exhibit a water vapor-permeability ($P'H_2O$) of $1.0 \times 10^{-3}$ cm$^3$/cm$^2$ $\cdot$sec$\cdot$cmHg and an isopropyl alcohol vapor-permeability ($P'org$) of $3.3 \times 10^{-7}$ cm$^3$/cm$^2 \cdot$sec$\cdot$cmHg, under such conditions that a mixed gas comprising 10% by weight of water vapor and 90% by weight of isopropyl alcohol vapor is fed into the module at a temperature of 130° C. under a pressure of 2 kg/cm$^2$G, and the permeation side pressure of the module is reduced to 4 mmHg. The hollow fibers had an asymmetric structure consisting of an inner porous layer and an outer dense layer.

In the module 34, the superheated mixed gas was fed into a mixed gas-feed section 2 through a mixed gas-feed inlet 2a to cause the mixed gas to flow through the hollow portions of the hollow fibers toward the non-permeated gas-delivery section 3, while allowing the water vapor fraction in the mixed gas to selectively permeate through the shell portions of the hollow fibers 6. Simultaneously, a dry nitrogen gas was heated in a heater 36 to a temperature of 120° C. and fed into a carrier gas-introduction pipe 9. The carrier gas was introduced into the continuous space 6a formed between the hollow fibers 6 and surrounded by a cylindrical polyimide film member 11 through a plurality of apertures formed in the pipe 9. The introduced carrier gas flows through the continuous space 6a substantially along the asymmetric hollow fiber, while diluting the permeated water vapor diffusing into the continuous space 6a in the permeation side of the module 34. The pressure in the permeation side of the module 34 was reduced to 100 mmHg by an ejector type vacuum apparatus 40.

The carrier gas/permeated water vapor mixture was delivered from the module 34 through a permeated gas-delivery outlet 5 and cooled to a temperature of 20° C. by a cooler 37, to condense the water vapor and to separate the carrier (nitrogen) gas from the condensed water. The condensed water was stored in the tank 38, and the separated carrier (nitrogen) gas was delivered from the tank 38 to the outside of the system through a vacuum pump 40. Also, the non-permeated gas (isopropyl alcohol vapor having a reduced water content) was delivered from the module 34 through a non-permeated gas-delivery outlet 3a and cooled by a cooler 42. The condensed isopropyl alcohol was stored in a product tank 43.

The dewatering conditions and result of the above-mentioned procedures are shown in Table 1.

Comparative Example 1

The same dewatering procedures as in Example 1 were carried out by using the same mixed gas-separating system as in Example 1, except that the cylindrical container had no carrier gas-feed inlet, and thus no carrier gas was fed into the module, no cylindrical film member was arranged around the hollow fiber bundle, and the mixed gas separating conditions were as shown in Table 1.

The dewatering result is shown in Table 1.

Comparative Example 2

The same dewatering procedures as in Example 1 were carried out by using the same mixed gas-separating system as in Example 1, except that the cylindrical container had no carrier gas-feed inlet and thus no carrier gas was fed into the module, and the mixed gas-separating conditions were as shown in Table 1.

The dewatering result is shown in Table 1.

Comparative Example 3

The same dewatering procedures as in Example 1 were carried out by using the same mixed gas-separating system as in Example 1, except that no cylindrical film member was arranged in the mixed gas separating membrane module, and the mixed gas-separating conditions were as shown in Table 1.

The dewatering result is shown in Table 1.

Particularly, a dry organic substance vapor having a very high dryness, namely an extremely low water vapor content can be easily obtained by using a small scale mixed gas-separating membrane module having a relatively low membrane surface area, with a high efficiency, namely at a high water vapor-permeating rate per unit permeation surface area of the mixed gas-separating membrane.

What is claimed is:

1. A mixed gas-separating membrane module comprising;
   (1) a cylindrical container having a mixed gas-feed section having a mixed gas-feed inlet, a non-permeated gas-delivery section having a non-permeated gas-delivery outlet, and a middle section located between the mixed gas-feed section and the non-permeated gas-delivery section and having a carrier gas-feed inlet and a permeated gas-delivery outlet;
   (2) a bundle of a plurality of mixed gas-separating hollow fibers each comprising a shell portion and a hollow portion surrounded by the shell portion, each extending through the middle section of the cylindrical container and each having an end portion thereof opening to the mixed gas-feed section and an opposite end portion thereof opening to the non-permeated gas-delivery section;
   (3) a pair of a first hollow fiber-supporting disks, which support the end portions of the hollow fibers opening to the mixed gas-feed section and partitions the middle section from the mixed gas-feed section, and a second hollow fiber-supporting disk, which supports the opposite end portions of the hollow fibers opening to the non-permeated gas-delivery section and partitions the middle section from the non-permeated gas-delivery section,
   the first and second hollow fiber-supporting disks supporting the hollow fibers in such a manner that the hollow fibers are spaced from each other, to leave a continuous space between the hollow fibers; and
   (4) a cylindrical film member surrounding the hollow fiber bundle to such an extent that the continuous space

TABLE 1

| Item | Example No. | Cylindrical film member | Flow rate of carrier gas (N$_2$) (l/min) | Feed pressure of mixed gas (Kg/cm2G) | Permeated gas pressure (mmHg) | Feed rate of mixed gas (Kg/hr) | Water content of mixed gas (wt %) | Delivery rate of permeated gas (Kg/hr) | Water content of permeated gas (wt %) | Delivery rate of non-permeated gas (Kg/hr) | Water content of non-permeated gas (wt %) |
|---|---|---|---|---|---|---|---|---|---|---|---|
| Example | 1 | Arranged | 1.63 | 1.01 | 100 | 1.831 | 4.87 | 0.0639 | 95.02 | 1.731 | 0.0639 |
| Comparative | 1 | None | 0 | 1.04 | 100 | 1.849 | 4.96 | 0.071 | 95.2 | 1.723 | 1.856 |
| | 2 | Arranged | 0 | 1.01 | 100 | 1.831 | 4.87 | 0.0639 | 95.02 | 1.717 | 1.731 |
| Example | 3 | None | 1.63 | 1.02 | 102 | 1.830 | 4.96 | 0.0896 | 97.9 | 1.711 | 0.193 |

Table 1 shows that when no carrier gas was employed, the arrangement of the cylindrical film member surrounding the hollow fiber bundle had substantially no effect on enhancement of the dewatering efficiency. In the mixed gas-separating membrane module and process of the present invention in which the cylindrical film member is arranged around the hollow fiber bundle and a carrier gas is fed into the continuous space surrounded by the cylindrical film member, the dewatering effect on the mixed gas is very high and, thus, in Example 1, the resultant non-permeated gas had an unexpectedly low water content.

In the present invention using the specific mixed gas-separating membrane module, the mixed gas can be separated into component gas fractions with a high efficiency.

formed between the hollow fibers is connected to the permeated gas-delivery outlet of the middle section,
   wherein, in the middle section, the permeated gas-delivery outlet is located close to the first hollow fiber-supporting disk and the carrier gas-feed inlet is located close to or in the second hollow fiber-supporting disk, to allow the carrier gas fed into the middle section through the carrier gas-feed inlet to flow through the continuous space formed between the hollow fibers and surrounded by the cylindrical film member, countercurrently to the flow of the mixed gas through the hollow portions of the hollow fibers.

2. The mixed gas-separating membrane module as claimed in claim 1, wherein the cylindrical film member covers at least 70% of the total area of the peripheral face of the bundle of the hollow fibers.

3. The mixed gas-separating membrane module as claimed in claim 1, wherein an end of the cylindrical film member is fixed to the second hollow fiber-supporting disk.

4. The mixed gas-separating membrane module as claimed in claim 1, wherein an end of the cylindrical film member is fixed on a fixing member projected inward from the inside peripheral face of the middle section of the cylindrical container.

5. The mixed gas-separating membrane module as claimed in claim 1, further comprising a carrier gas-introduction pipe through which a carrier gas-supply source is connected to a substantially center portion of the hollow fiber bundle through the second hollow fiber-supporting disk, whereby the carrier gas is allowed to flow from the center portion toward the permeated gas-delivery outlet through the continuous space formed between the hollow fibers.

6. The mixed gas-separating membrane module as claimed in claim 5, wherein the carrier gas-introduction pipe is inserted into the center portion of the hollow fiber bundle and the inserted portion of the pipe has a closed end and a plurality of apertures formed in a portion of the pipe close to the second hollow fiber-supporting disk, to allow the carrier gas to be introduced into the middle section of the cylindrical container through the apertures of the pipe and to flow through the continuous space formed between the hollow fibers.

7. The mixed gas-separating membrane module as claimed in claim 1, wherein the mixed gas-separating hollow fibers comprise aromatic polyimide hollow fibers.

8. The mixed gas-separating membrane module as claimed in claim 1, wherein the mixed gas-feed inlet is connected to a supply source of a mixed gas comprising water vapor and an organic substance vapor, the hollow fibers comprise aromatic polyimide hollow fibers; the carrier gas-feed inlet is connected to a supply source of a carrier gas comprising a dry inert gas or a portion of the non-permeated gas fraction delivered through the non-permeated gas-delivery outlet; the permeated gas-delivery outlet is connected to a pressure-reducing means, whereby the water vapor is separated from the organic substance vapor through the aromatic polyimide hollow fibers, and is delivered as a permeated gas, together with the carrier gas, and the organic substance vapor having a reduced content of water vapor is collected as a non-permeated gas.

9. The mixed gas-separating membrane module as claimed in claim 1, wherein the cylindrical container has at least one removable end portion, and the hollow fiber bundle and the first and second hollow fiber-supporting disks and the cylindrical film member are combined to form a replaceable cartridge.

10. A process for separating a mixed gas by using the mixed gas-separating membrane module as claimed in claim 1, comprising:

feeding a mixed gas comprising a first gas fraction and a second gas fraction into the mixed gas-feed section of the cylindrical container through the mixed gas-feed inlet, to cause the fed mixed gas to flow through the hollow portions of the hollow fibers, the first gas fraction having a permeation rate through the shell portions of the hollow fibers in a ratio to that of the second gas fraction of at least 100, thereby to allow the first gas fraction to permeate through the shell portions of the hollow fibers;

simultaneously feeding a carrier gas into the middle section of the cylindrical container through the carrier gas-feed inlet, while reducing the pressure of the middle section of the cylindrical container, to cause the fed carrier gas to flow through the continuous space formed between the hollow fibers toward the permeated gas-delivery outlet, while forcibly diluting the permeated first gas fraction therewith;

delivering the permeated first gas fraction diluted with the carrier gas through the permeated gas-delivery outlet; and collecting the non-permeated second gas fraction passing through the hollow portions of the hollow fibers, and received in the non-permeated gas-delivery section through the non-permeated gas-delivery outlet.

11. The mixed gas-separating process as claimed in claim 10, wherein the mixed gas comprises, as a first gas fraction, water vapor and as a second gas fraction, a vapor of at least one organic substance having a boiling temperature of from 0° C. to 200° C. under the ambient pressure.

12. The mixed gas-separating process as claimed in claim 11, wherein the organic substance for the second gas fraction comprises isopropyl alcohol.

13. The mixed gas-separating process as claimed in claim 10, wherein a portion of the collected non-permeated second gas fraction is recycled to the carrier gas-feed inlet and is used as a carrier gas.

14. The mixed gas-separating process as claimed in claim 10, wherein the carrier gas comprises nitrogen gas.

15. The mixed gas separating process as claimed in claim 10, wherein the mixed gas comprises water vapor as a first gas fraction and isopropyl alcohol vapor as a second gas fraction; the hollow fibers are aromatic polyimide hollow fibers; and the carrier gas comprises a dry inert gas, whereby the water vapor is separated from the isopropyl alcohol vapor through the shell portions of the aromatic polyimide hollow fibers, and is delivered, as a permeated gas, together with the carrier gas, and the isopropyl alcohol vapor having a reduced water vapor content is collected as a non-permeated gas.

16. The mixed gas-separating process as claimed in claim 10, further comprising subjecting, before the mixed gas is prepared from a corresponding mixed liquid, the mixed liquid to at least one refining treatment selected from the group consisting of ion-exchange resin treatments, distillation treatments and filtration treatments.

17. The mixed gas-separating process as claimed in claim 10, further comprising subjecting the collected non-permeated gas fraction to a liquefying procedure and then to at least one refining treatment selected from the group consisting of ion-exchange resin treatments, distillation treatments and filtration treatments.

* * * * *